United States Patent [19]
Vetter

[11] 4,267,578
[45] May 12, 1981

[54] CALCULATOR SYSTEM WITH ANTI-THEFT FEATURE

[75] Inventor: Edward O. Vetter, Dallas, Tex.

[73] Assignee: Texas Instruments Incorporated, Dallas, Tex.

[21] Appl. No.: 500,420

[22] Filed: Aug. 26, 1974

[51] Int. Cl.³ .............................................. G06F 7/00
[52] U.S. Cl. .............................. 364/709; 340/365 R; 364/715
[58] Field of Search .......................... 235/156, 61.7 B; 340/172.5 R, 147 R, 149 R, 146.1 R, 324 R, 147 MD, 365; 317/134; 364/700, 709, 715; 361/1

[56] References Cited

U.S. PATENT DOCUMENTS

| | | | |
|---|---|---|---|
| 3,609,697 | 9/1971 | Blevins et al. | 340/146.1 |
| 3,702,987 | 11/1972 | Twyford | 340/172.5 |
| 3,806,882 | 4/1974 | Clarke | 340/172.5 |

FOREIGN PATENT DOCUMENTS 1574552  9/1971  Fed. Rep. of Germany ........... 235/156

OTHER PUBLICATIONS

Foster; "Battery Powered Date Entry Unit", –IBM Technical Disclosure Bulletin, vol. 15, No. 11, Apr. 1973, pp. 3437–3438.

Primary Examiner—Errol A. Krass
Attorney, Agent, or Firm—John G. Graham

[57] ABSTRACT

A calculator anti-theft system for preventing theft of small, personal electronic calculators comprises a keyboard, a display, a calculator device, and means to store an anti-theft code individual to each calculator. The anti-theft code may be stored within the calculator device or may be stored in an external device. The calculator device is programmed to compare a specified number of the keyboard entries immediately following power-on to the individual stored anti-theft code. If the initial keyboard entries match the anti-theft code, the calculator is enabled, and normal operation is possible. If these first entries do not match the code, the display, the keyboard, or the calculator itself is disabled to prevent normal calculation. In other embodiments, comparison of the stored anti-theft code to the initial keyboard entries is made in a device external to the device which performs the normal calculation functions. Only if the entries and the code match are all the essential components of the calculator system allowed to operate.

24 Claims, 11 Drawing Figures

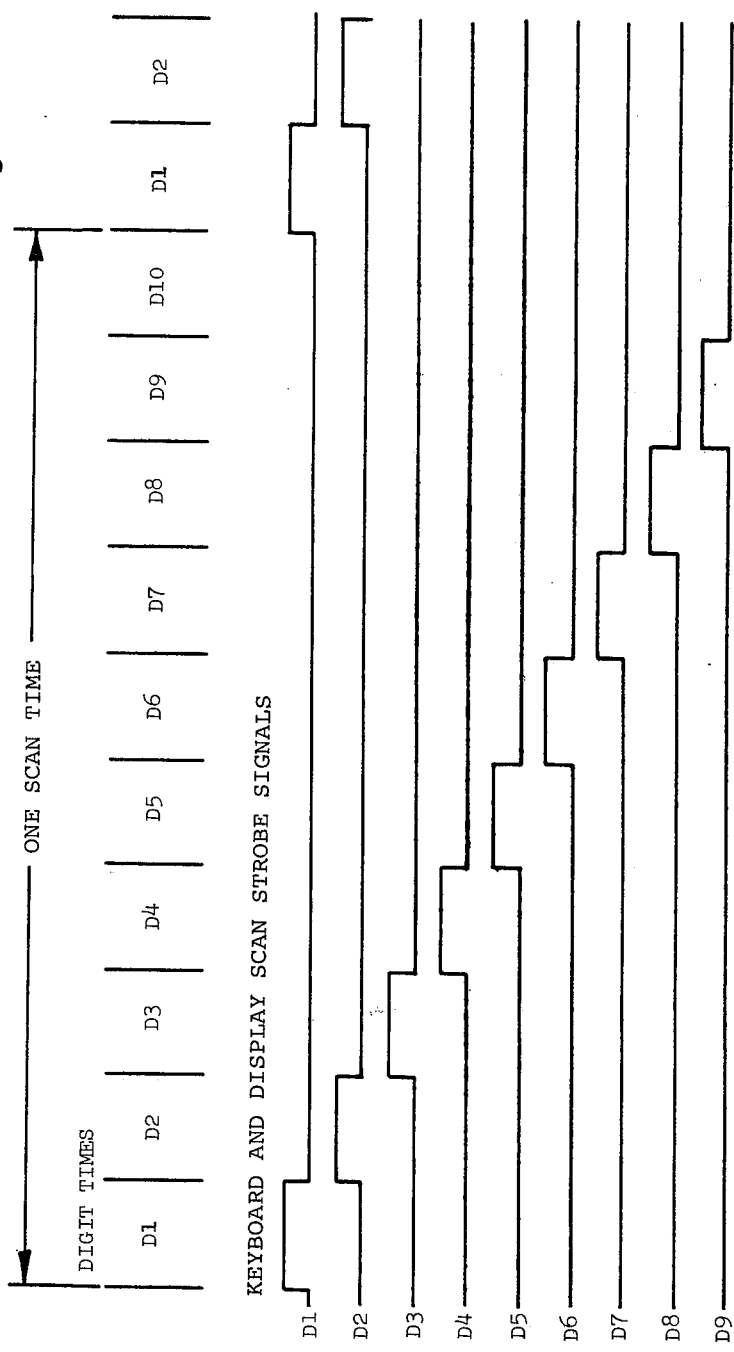

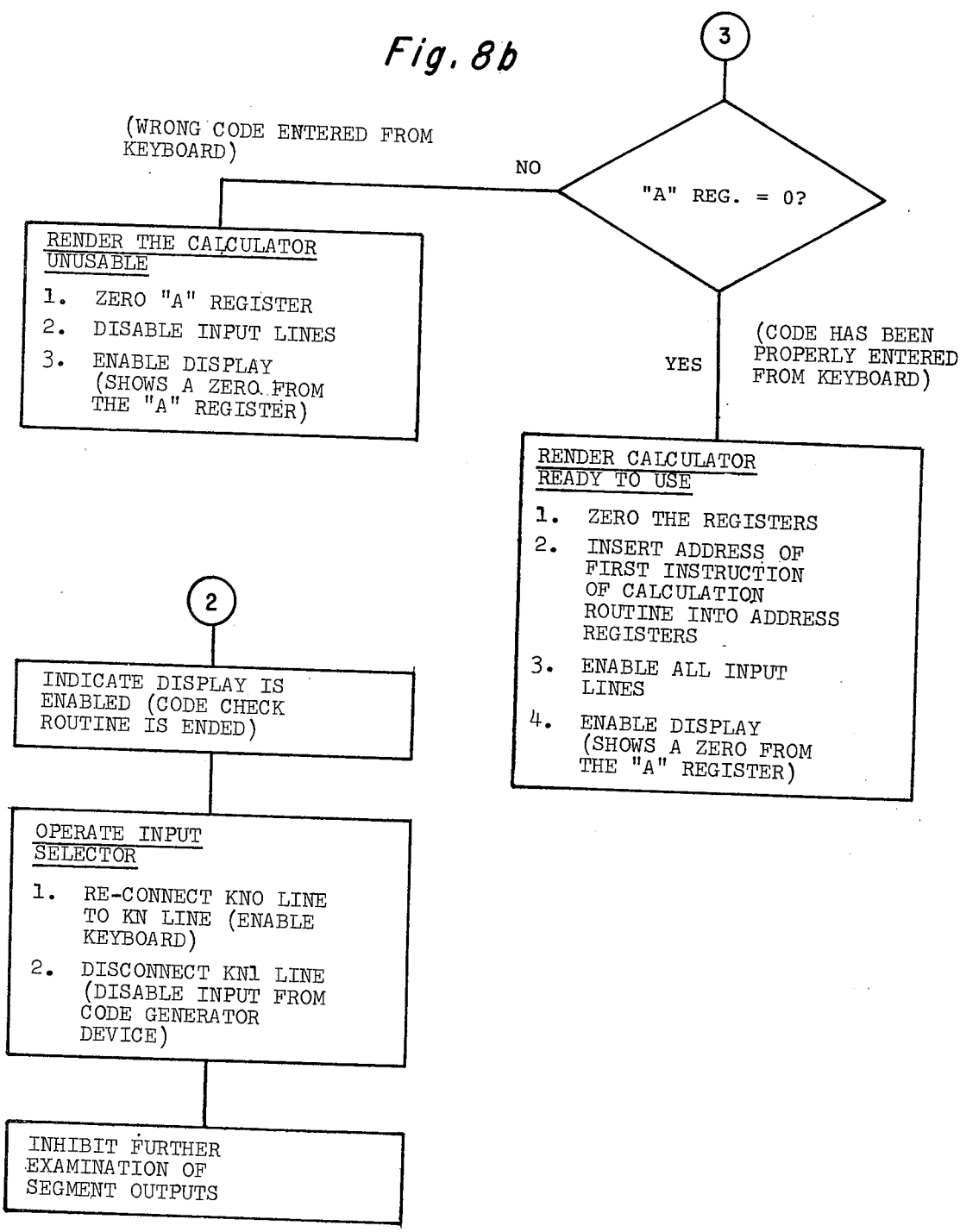

CALCULATOR SYSTEM WITH ANTI-THEFT FEATURE

BACKGROUND OF THE INVENTION

1. Field of the Invention

This invention relates to electronic calculator systems of the type wherein all the main electronic functions are integrated in a single large-scale-integrated (LSI) semiconductor chip or a few such devices, and more particularly, to providing means to protect portable handheld electronic calculator systems from theft by making such calculators unusable without knowledge of an anti-theft code.

2. Description of the Prior Art:

Perhaps the most popular type of electronic calculator available on the market today is the portable battery-powered type. This type of calculator may usually be held in the hand and fits easily into a shirt pocket. As such, it may easily be stolen and concealed if left lying on a desk or in a laboratory. It may be inconvenient for the owner to lock up the calculator or take it with him whenever he leaves his work area. Some means contained within the calculator itself are needed to protect the device from theft. If calculators were manufactured using discrete components, it would be relatively simple to provide a means for examining the first inputs from the calculator keyboard to determine if they matched an individual anti-theft code stored in the calculator memory. However, most calculators today are manufactured with a single large-scale-integrated semiconductor chip or a small number of such chips.

Electronic calculator systems of the type wherein all of the main electronic functions are integrated in a single large-scale-integrated semiconductor chip, or a small number of chips, are described in the following prior applications which are assigned to the assignee of this invention:

Ser. No. 317,493, filed Dec. 21, 1972 now U.S. Pat. No. 3,819,921 (originally filed Sept. 29, 1967, Ser. No. 671,777 now abandoned) by Jack S. Kilby et al, for "Miniature Electronic Calculator".

Ser. No. 420,999, filed Dec. 3, 1973 and now abandoned, by Gary W. Boone and Michael J. Cochran, for "Variable Function Programmed Calculator", a continuation of Ser. No. 163,565, filed July 19, 1971 now abandoned.

Ser. No. 444,226, filed Feb. 20, 1974 now U.S. Pat. No. 4,200,926, by Michael J. Cochran and Jerry L. Vandierendonck, for "Electronic Calculator Implemented In Semiconductor LSI Chips With Scanned Keyboard And Display", a continuation of Ser. No. 255,856, filed May 22, 1972 now abandoned.

Ser. No. 400,437, filed Sept. 24, 1973 now U.S. Pat. No. 3,987,416, by Jerry L. Vandierendonck, Roger J. Fisher, and Glenn A. Hartsell, for "Electronic Calculator With Display And Keyboard Scanning Signal Generator In Data Memory".

Ser. No. 397,060, filed Sept. 13, 1973, now U.S. Pat. No. 3,900,722 by Michael J. Cochran and Charles P. Grant, Jr., for "Multi-Chip Calculator System".

The concepts of these prior applications have made possible vast reductions in cost of small personal sized calculators.

It would be very costly to design and manufacture a different chip for each individual code since the economy of manufacturing in volume would not then be present. The chip which performs the electronic functions of the calculator must cost only a few dollars in order for the cost to be competitive. This requires high volume production, and it is not practical in such production to make every chip with a different code stored internally. Further, because a given chip design contains only a certain number of words of read-only-memory (ROM) storage for instructions stored internally, it is not practical to store all the possible codes within such ROM storage and select only one for use in each calculator. This limited amount of ROM storage also dictates that the scheme used for the anti-theft feature must not be so complicated that a large number of instruction words of the ROM are used in processing an anti-theft code. Also contributing to the cost of the LSI semiconductor chip which is used in the electronic calculator system is the number of input and output pins, and typically all pins connected to the chip are used to provide the functions of the calculator. Therefore, the scheme used to provide theft protection should not require additional pins, and if additional pins are required, their number must be kept to a minimum.

SUMMARY OF THE INVENTION

It is a primary object of this invention to provide a means whereby portable, hand-held electronic calculators can be provided with protection from theft in the form of a device which renders the calculator unusable without the entry from the keyboard of a code known only to the owner and to the manufacturer of the calculator.

It is another object of this invention to provide such an anti-theft device in a manner which preserves the economy of high volume production of the calculator chip which performs the electronic functions of the calculator.

It is yet another object of this invention to obtain the desired theft protection while keeping the additional ROM storage use in the main calculator system to a minimum in order to hold the cost of production of the calculator semiconductor chip as near as possible to the original cost of such chip.

It is a still further object of this invention to provide theft protection for the calculator without utilizing any further input/output pins of the main calculator chip or, if further such inputs or outputs are required, to minimize the number of those inputs and outputs.

In accordance with the aforementioned objects, a device is provided, within a portable, hand-held electronic calculator, which is connected to the keyboard, display, memory, and logic and control subsystems of the calculator. This device is capable of rendering the keyboard, display, or device which performs the functions of the calculator inoperative after a specified period of time unless a proper anti-theft code is entered. This code may be entered by depressing a number of keys in sequence on the calculator keyboard. If the proper code is entered, all the devices are made operative, and the calculator will perform its normal functions.

One embodiment of the invention uses a device external to the main calculator chip or chips to supply the individual anti-theft code of the particular calculator. The external device is in the form of semiconductor LSI circuitry and includes a programmable grid which may be either a ROM or a mask programmable grid of metallized strips and diffused conductors separated by a semiconductor insulating layer except at points of interconnection. The location of gates in the ROM or the location of points of interconnection in the metallized strip diffusion grid will determine the particular code produced by the external device. The external code generator device which forms the basis of the anti-theft feature of this invention also includes a timing unit used to produce timed inputs to the calculator chip similar to those inputs which are received from the keyboard. The remainder of the code generator device consists of logic and control subsystems used to examine the outputs of the calculator chip and thus determine the proper time for transmission of the anti-theft code to the main calculator. The entire code generator device with all associated subsystems can be produced on a single LSI chip.

In addition to the code generator device, a code check routine must be programmed into the memory of the main calculator and certain logic control features must be provided in the main calculator which are not necessary for its normal calculator functions. These features include a power up-clear circuit which will initialize the code check routine, a clear calculator circuit which will perform the normal clear operation from a keyboard "clear" key (independent of the power up-clear operation), and devices which will disable both the keyboard inputs and the display outputs. Such modifications as are necessary to the main calculator chip are only those which will require a single production technique. Because the individual anti-theft codes are provided by means of a smaller less complicated device, i.e., the code generator chip, the main calculator chip will not require a change of design or manufacturing technique for each code. Thus, all calculator chips will be produced alike, using a single set of masks and preserving the economies of high volume production. This feature of the invention also operates to keep the ROM storage used in the main calculator chip to a minimum since only instruction words of the code check routine are required to be stored in the ROM rather than a number of anti-theft codes which must be selected and checked against the initial keyboard inputs. Since the code generator device utilizes only the display outputs, the strobing scan signals, and the normal keyboard inputs of the main calculator chip, no further interconnections between the code generator device and the main calculator chip are required, and no additional input/output pins are required for the main calculator chip.

Other objects, advantages, and features of this invention will become apparent from the following detailed descriptions taken in conjunction with the accompanying drawings.

IN THE DRAWINGS

FIG. 3 is a timing diagram illustrating the keyboard and display scan strobe signals.

DESCRIPTION OF THE PREFERRED EMBODIMENTS

Figure 1:
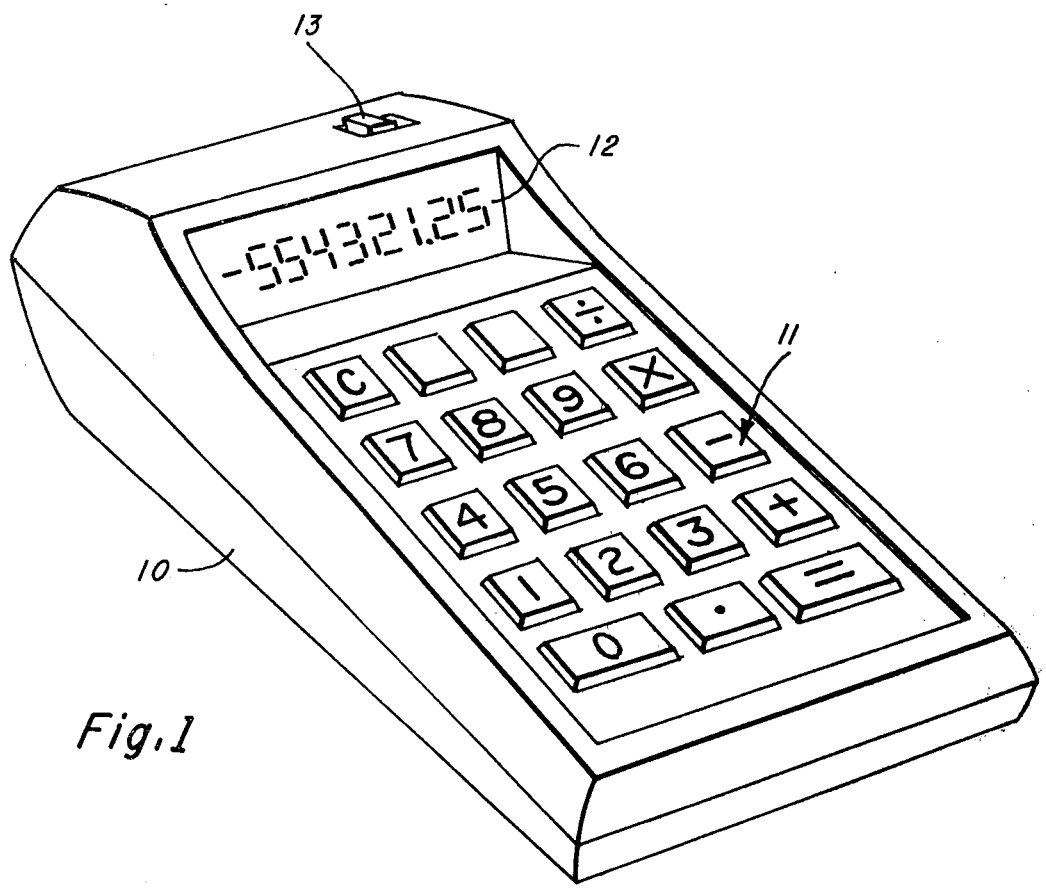
FIG. 1 is a pictorial view of a portable hand-held electronic calculator embodying the anti-theft principle of the present invention.

Referring to FIG. 1, there is shown a typical portable hand-held electronic calculator which contains the anti-theft feature of this invention. The calculator itself is contained within the small housing 10 of molded plastic or similar substance and includes a keyboard 11 of the ten key type having ten decimal number keys 0–9 along with a decimal point key and several function keys such as plus (+), minus (−), etc. A display 12 is provided which typically would be eight digits plus an annotator; the display 12 may be in the form of segmented light emitting diodes (LED), a gas discharge display panel, or a fluorescent type display. An on/off switch 13 may be located on the top face or any other convenient location on the calculator.

Figure 2:
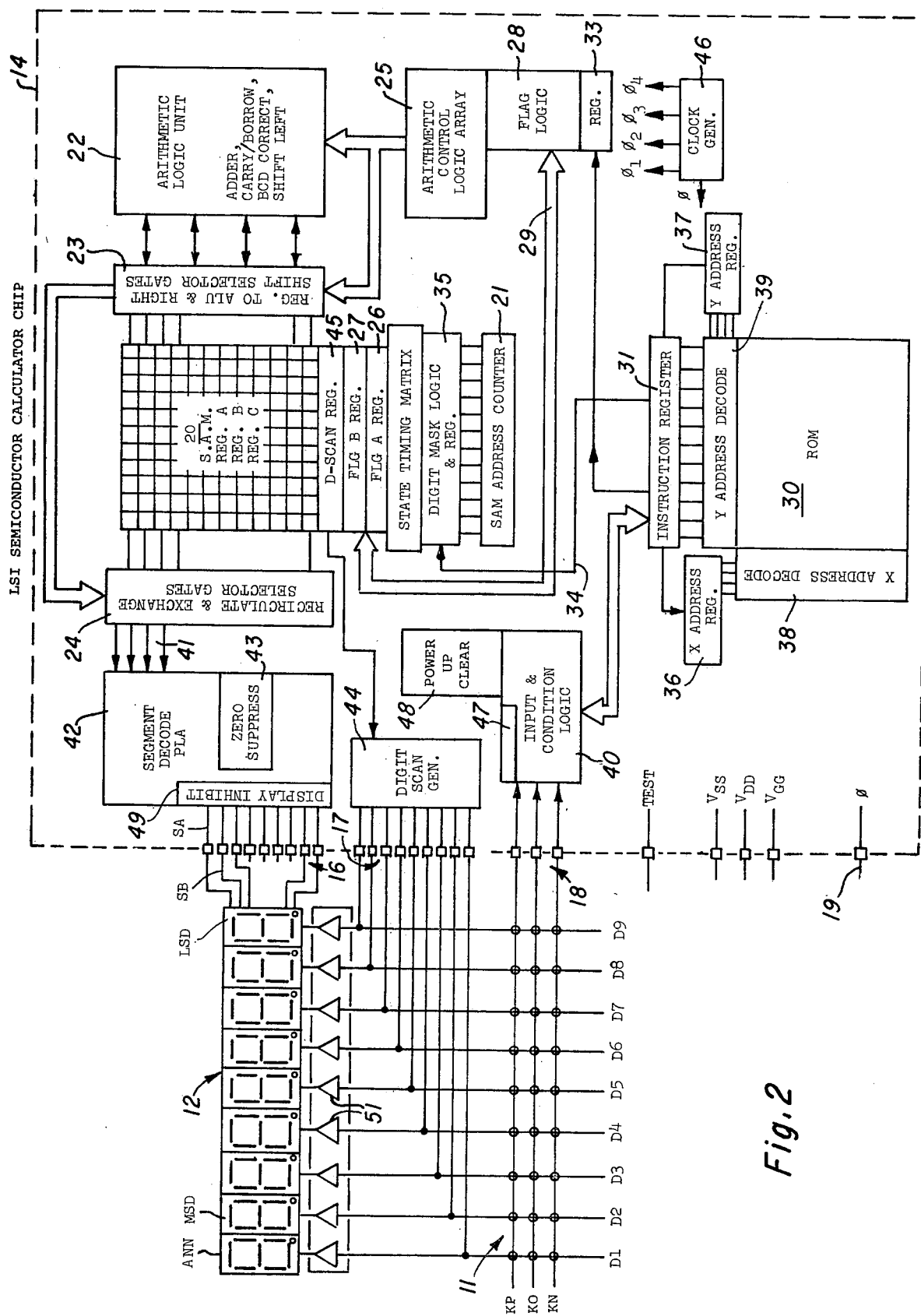
FIG. 2 is a block diagram of a typical LSI semiconductor calculator chip and its associated keyboard and display devices, which may be used with the anti-theft feature of this invention.

With reference to FIG. 2, a typical single chip electronic calculator system is illustrated in schematic form. A calculator chip of this type is fully described in co-pending application, Ser. No. 400,437 now U.S. Pat. No. 3,987,416. While any of the electronic calculator systems described in the aforementioned applications, Ser. Nos. 317,493 now U.S. Pat. No. 3,819,921, 420,999 now abandoned, or 397,060 U.S. Pat. No. 3,900,722, might well be utilized in an embodiment of this invention, the particular system of the type which was fully described in copending application, Ser. No. 400,437 now U.S. Pat. No. 3,987,416, is used herein to illustrate the concept of this invention. The calculator of FIG. 2 consists of an LSI semiconductor chip 14 which performs the electronic functions of the calculator, a segmented output display 12, a number of display drivers 51, and a keyboard 11. The chip 14 would typically have twenty-eight input and output pins. Eight of these pins are used to provide the segment output signals to the eight segments of each digit of the display 12. In addition to these eight segment output pins 16, there are nine pins which supply the D lines 17 which carry pulses used to strobe the keyboard 11 and display 12. The display drivers 51 are used to amplify these D line pulses to a level sufficient to drive the segments of the display 12. The inputs to the calculator chip 14 from the keyboard 11 are supplied on three lines 18. The remainder of the pins from the calculator chip 14 are utilized for test signals, supply voltages, and the clock frequency line 19. The display outputs 16 are applied directly (without segment drivers) to the segments of the display 12. All similar segments in the various digits are connected together, in the usual manner. The digits of the display are actuated one at a time by a scanning arrangement using the outputs 17, and these scan signals D1 to D9 are also used to poll the keyboard which is in the form of a matrix of key switches. All of the number keys 1 to 9 are on a single one of the input lines 18 called the KN line, the number key "O" is on the KO line, and the operation keys are on KO and KP lines. So, all of the keyboard information comes in encoded on three lines 18, correlated internally with the "D times" or keyboard/display strobes D1 to D9 on lines 17. These "D times" are generated in a digit scan register 44.

FIG. 3 illustrates the sequence of D times used for strobing the display and keyboard. Note that there is one dead time, D10. A complete scan of the display and keyboard referred to as a "scan time" occurs once every ten D times or instruction cycles, i.e., once every 2640 to 4000 microseconds or 2.6 to 4 milliseconds. That is, the display or keyboard is completely scanned about 200 to 400 times a second. A person operating the calculator would manually depress a key for at least a few tenths of a second or more, so it is seen that at least about fifty or more complete scans would occur during the time a key is down. This would represent more than 500 instruction cycles, so almost any calculation or operation within the calculator would be completed faster than a person could punch the keys. Considering the display 12, a given digit such as the right hand digit which is LSD will be turned on or lit up only during D9 or once every scan time, i.e., for say 300 microseconds every 3000 microseconds, a duty cycle of one-tenth. It will blink on and off 200 to 400 times a second, which is far above the rate which the eye can perceive, so the display seems to be steady rather than being scanned in sequence.

In FIG. 3, it is seen that the digit times progress from MSD to LSD, going from D1 to D9 as seen in FIG. 2. The data in one digit of the A register in the SAM 20 is brought out through the segment decoder 42 for display during each D time.

Figure 4A:
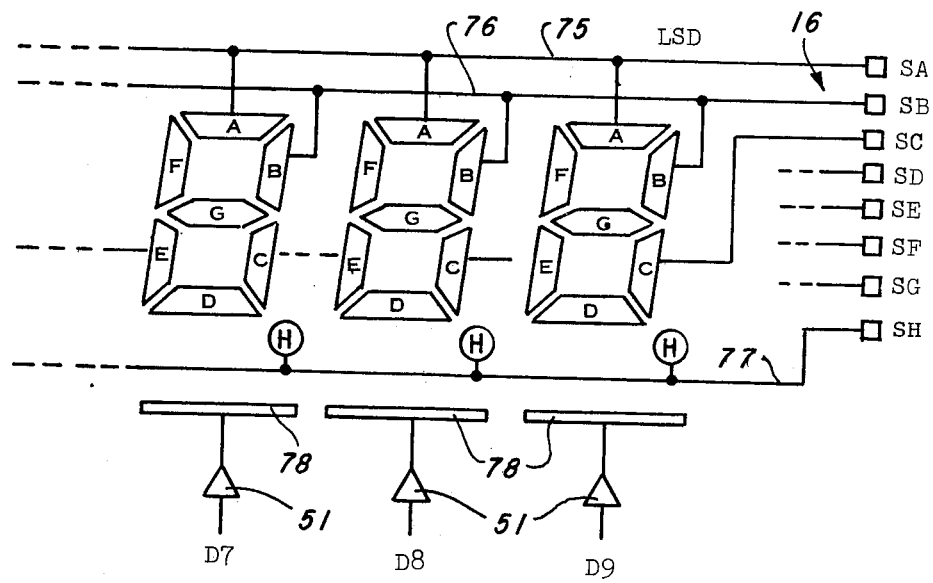
FIGS. 4a and 4b are diagrams and tables illustrating the display output devices and output signals.

Referring to FIG. 4a, the display 12 is shown in more detail. Three of the nine digits are shown. Each digit is made up of seven segments A to G plus a decimal point H. The outputs 16 from the chip are labeled SA to SH corresponding to the segments in the display. All of the A segments are connected together by a line 75, all B's are connected together by a line 76, etc., and all decimal points H are connected together by a line 77. The segments represent cathodes in a LED unit, or in a gas discharge panel. The D scan outputs D1 to D9 are separately connected to anodes 78 which represent transparent metal film covering the cathodes in a gas discharge panel display or anodes common to all cathode segments in a digit for LED displays. Digit drivers 51 couple the D lines 17 to the anodes 78; these are merely amplifiers to provide the proper voltage levels for actuating the display elements. All of the drivers 51 may be contained in a pair of bipolar integrated circuits.

Figure 4B:
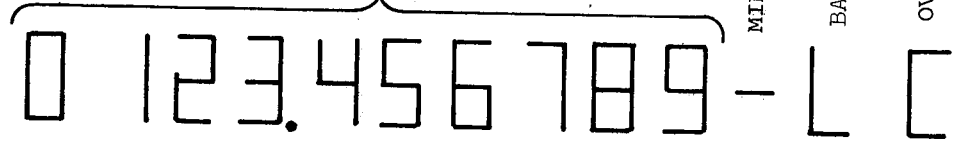

In FIG. 4b, one code for actuating the display of FIG. 4a is shown. For example, to show a zero, all segments except SG are actuated. To show a one, segments SC and SB are actuated. The code of FIG. 4b is programmed into the segment decoder output PLA 42; this PLA is gate programmable so that different codes could be used for different types of displays.

With reference again to FIG. 2, the calculator chip 14 includes three working registers, called registers A, B, and C, located within a sequentially addressed memory 20 which is referred to as a S.A.M.

The program for operating the calculator is stored in a read-only-memory or ROM 30, which contains a limited number of bits of storage, arranged in words with 11 bits per word. One word at a time is read out of the ROM into an instruction register 31, and the 11 bit word existing in this register defines what happens in the calculator during a given instruction cycle. A part of the instruction word is applied serially from register 31 via line 32 to a register 33 which is connected to both the arithmetic control array 25 and the flag logic array 28 in common. Another part of the instruction word is applied via line 34 to a register within a digit mask logic array 35 in the SAM 20, as is explained in copending application, Ser. No. 400,437. The particular instruction word read out of the ROM at a given time is defined by X and Y address registers 36 and 37. The X and Y registers 36 and 37 control X and Y address decoders 38 and 39. The ROM is partitioned into eleven segments so that for a given six bit X address and three bit Y address, eleven bits are addressed and read out from the ROM into the instruction register 31. The word in the instruction register 31 defines the current operation of the system and, along with input and condition logic 40, produces the next address for the ROM. The address registers 36 and 37 may be incremented, one location at a time, or may jump or branch to a specified location (loaded from the instruction register 31) under control of input and condition logic 40. This logic unit 40 receives the keyboard inputs 18 and generally initiates control or operation of the various parts of the system and provides for data input, along with the program in the ROM. In general terms, operation of the system is totally defined by generating a ROM address by the logic arrangement 40 in conjunction with the instruction register 31, in response to a particular key in the keyboard 11 having been pressed, then jumping to that address in the ROM and reading out the instruction word into the register 31 and implementing it. Then, the X and Y address registers are incremented to the next address or perhaps caused to branch to a remote address until the function represented by that key has been completed, which may take several or a dozen instruction words, then the system goes back into a wait mode until another key is punched. In the wait mode, the system is cycling through instruction words which in effect scan the keyboard and at the same time cause the number entered or the result to be shown on the display 12.

The A register in the SAM 20 is always the source of data displayed in the display 12. A number being entered is always displayed, so it is entered in the A register; a result from a calculation is displayed, so it goes into the A register upon completion of a calculation. So, output from the SAM 20 to the display 12 is from the A register and is coupled via lines 41 through a segment decoder and output PLA 42 which functions to change a BCD number, one digit at a time, to a selected combination of segments on the lines 16 going to a decimal digit display 12. This is accomplished generally by means of a programmable logic array. Zero suppression means 43 is included in the output PLA.

Minor changes of the calculator chip 14 of copending application, Ser. No. 400,437 now U.S. Pat. No. 3,987,416, and external devices, i.e., keyboard 11, display 12, and display drivers 51, are included to implement an embodiment of this invention. Of course, the ROM 30 must be programmed to include a code check routine. This code check routine will be the same for all calculators; there will be no need for further changes to the ROM 30 in order to provide for any individual code to be used with a particular calculator. Implementation of the code check routine will necessitate appropriate programming of the flag logic 28, which is a programmable logic array (PLA) designed for the purpose of providing many alternative operating modes. The power up-clear circuit 48 which is used to zero the registers of the calculator and insert an initial instruction address in the instruction register 31 will also require minor changes in order for the calculator chip of the type described in copending application, Ser. No. 400,437, to be used in an embodiment of the present invention. Each of the changes required need only be made once to provide any number of possible codes for the anti-theft feature of this invention.

Figure 5:
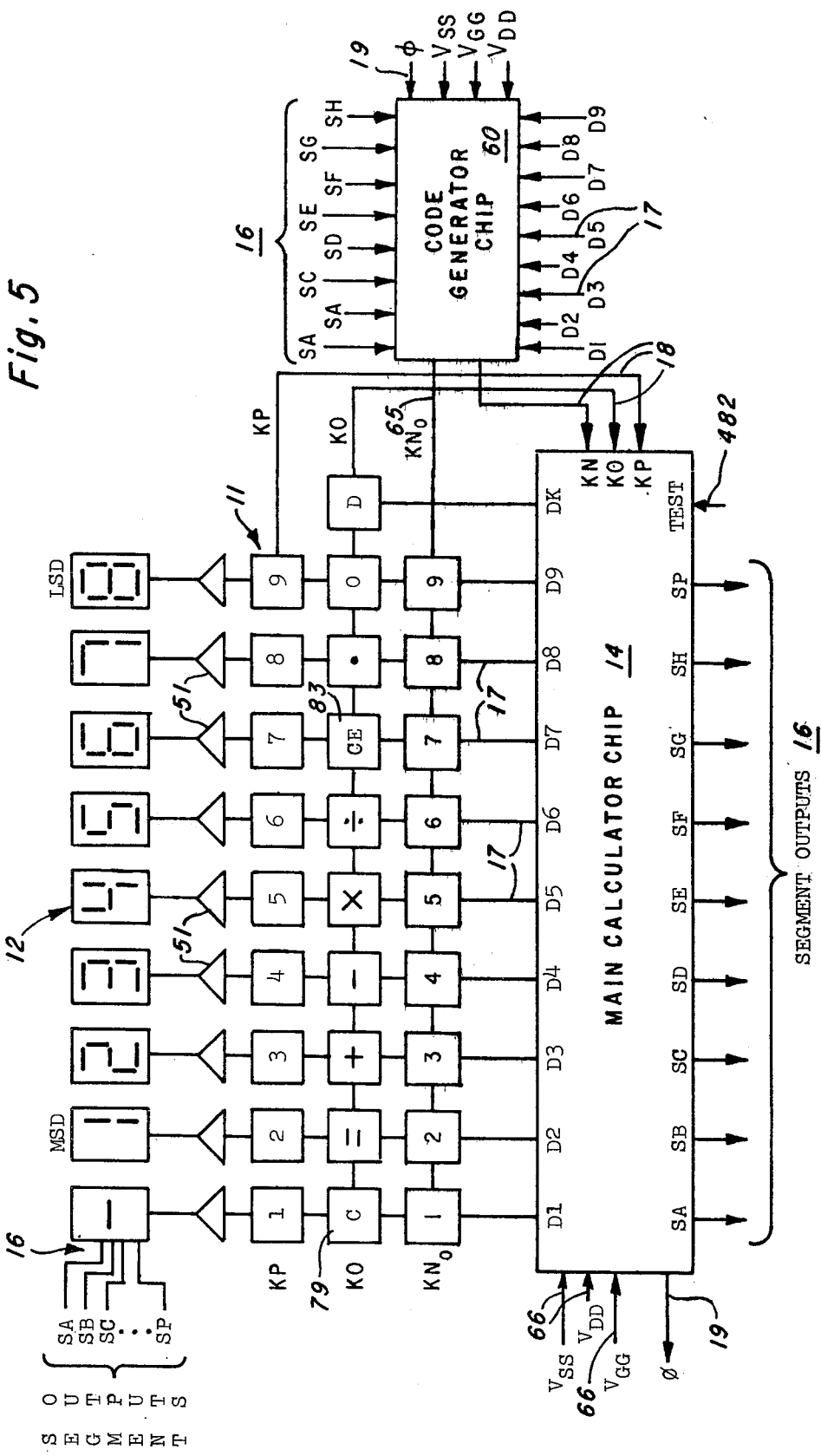
FIG. 5 is a diagram showing the relationship and interconnections between the output devices, the keyboard, the code generator chip, and the main calculator chip.
Figure 6A:
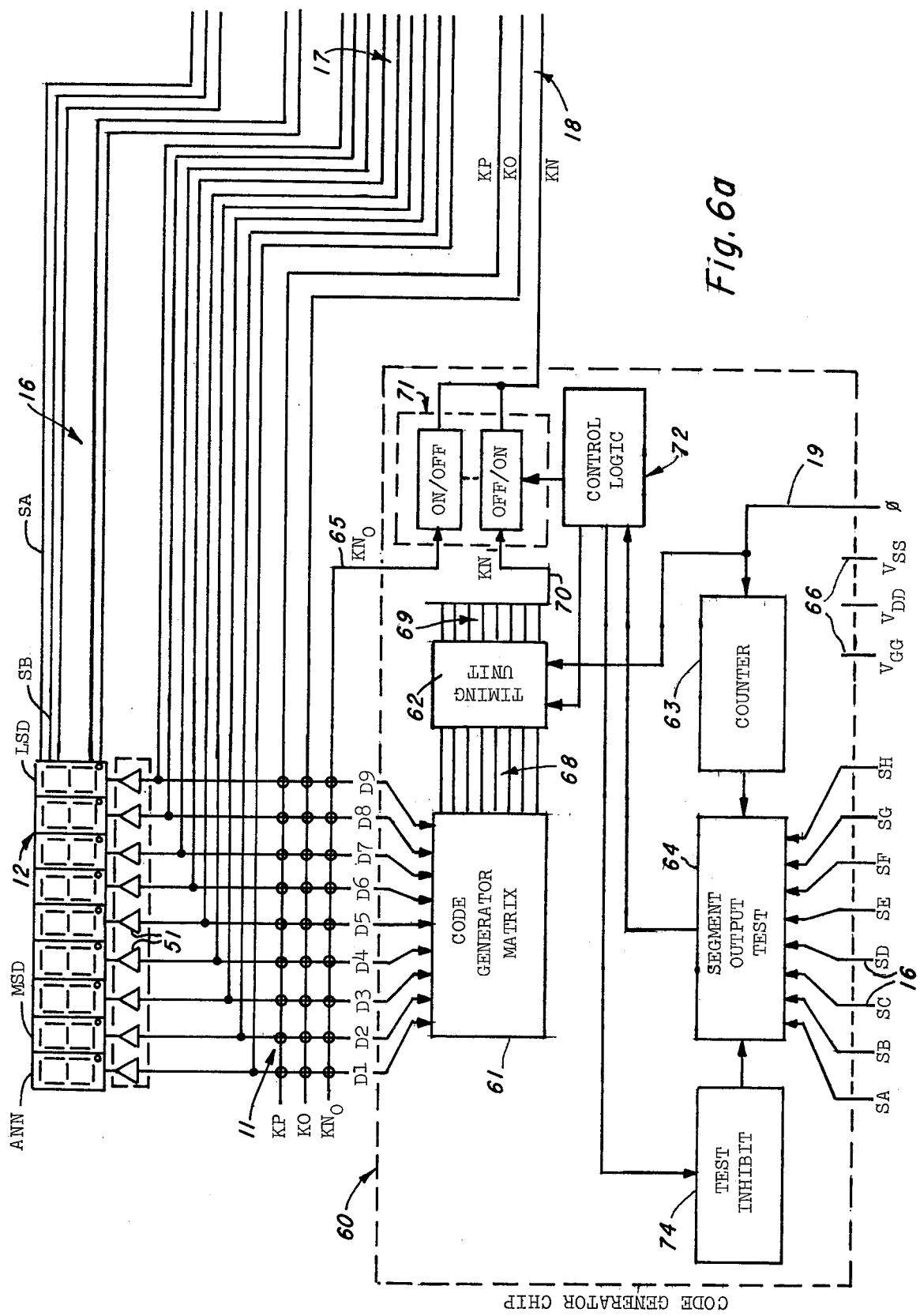
FIGS. 6a and 6b are block diagrams showing the components of the main calculator chip, the code generator chip of the anti-theft feature of this invention, the output devices, and the keyboard.
Figure 6B:
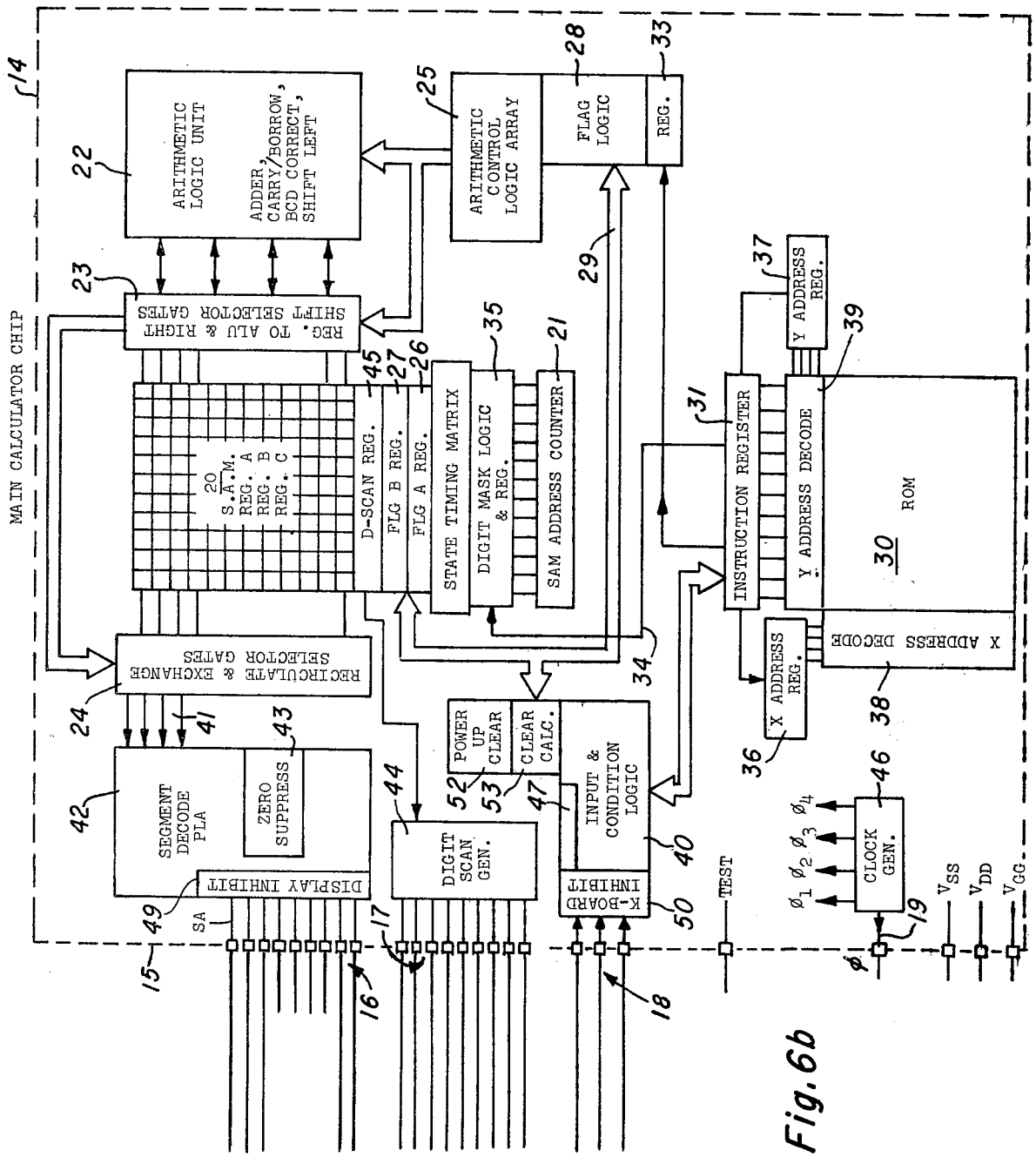

Referring now to FIGS. 5, 6a and 6b, a typical one chip electronic calculator embodying the anti-theft feature of the present invention is illustrated diagrammatically. FIGS. 6a and 6b show the major components of the invention in block diagram form. In this embodiment, the main calculator chip 14 performs all the calculator functions, receives input from the keyboard 11, processes data, and produces an output for the display 12. A second LSI semiconductor chip provides the individual anti-theft code for the calculator. The code generator chip 60 can be produced in a twenty-four pin package. The inputs to the code generator chip 60 are the nine D lines 17, the segment outputs 16, the KNO line 65, the supply voltages 66, and the clock frequency line 19 from the main chip 14. The single output of the code generator 60 is the KN line 18 which supplies the code signal and keyboard input signals to the main chip 14. The basic components of the code generator chip 60 include the code generator matrix 61 which is strobed by the D time signals on the D lines 16. The code generator matrix 61 may be a ROM or alternatively may be a mask programmable grid of metallization strips and "P" diffused conductors in integrated circuit form, with selected interconnections between metal and diffusions. Either device may be programmed to provide the individual anti-theft code. The eight outputs 68 of the matrix pass through the timing unit 62 which gates the signals to simulate a keyboard entry. Signals on lines 69 which are supplied through the timing unit 62 are each a few tenths of a second long in order to produce an input on the KN1 line 70 which can be read and processed by the main calculator chip 14 using the same method as that used to process a series of signals created by pressing the keys 11 of the calculator.

Both the KN1 line 70 and the KNO line 65 are gated through the input selector 71. The output of the selector 71 is the KN line 18 which is applied to the main calculator chip 14 along with the other input lines 18. The input selector 71 is operated by the control logic 72 so that the keyboard inputs on the KNO line 65 are passed through the input selector 71 except during the time when the code generator 60 is producing a code signal on the KN1 line 70 to be applied to the calculator chip 14. Thus, during the time that a code signal is being produced, the KNO line and keyboard inputs are disabled and the KN1 line 70 provides the sole input to the KN line 18 and the calculator chip 14. At all other times, the keyboard inputs are enabled and the KN1 line 70 is disabled. The control logic 72 is further used to operate the timing unit 62 only when a code signal is required at the input of the calculator chip 14.

In this embodiment, the ROM 30 of the calculator chip 14 has been programmed to accept eight digits punched in from the keyboard 11 on the KN line 18, place the digits in the A register of the sequentially addressed memory 20, and show on the output display 12 the eight digits which have been read. The code check routine programmed into the ROM 30 then causes the display 12 to be disabled by means of inhibiting the segment outputs 16 with the display inhibit 49. The display 12 must be disabled once the eight digit code has been read from the keyboard 11 in order to prevent the display of the correct code sequence which will now be entered in the A register of the sequentially addressed memory (SAM) 20 by the code generator 60. When the display 12 is disabled, the segment outputs 16 will carry no signals to operate the display 12. The segment outputs 16 are provided as inputs to the code generator 60. These segment outputs 16 are continually examined by the segment output test circuit 64 of the code generator 60. When no signals have been detected on the segment outputs 16 for a sufficient period of time as determined by the counter 63, the segment output test circuit 64 produces a signal on line 73 which is applied to the control logic 72 to begin the transmission of the proper code sequence to the calculator chip 14. Once the proper code sequence has been sent from the code generator 60, the control logic 72 operates the test inhibit 74 to prevent further examination of the segment outputs 16. The control logic 72 then deactivates the timing unit 62 and operates the input selector 71 in order to allow the keyboard input on KNO line 65 to be passed through to the KN line 18.

In order to provide a calculator chip 14 which is acceptable for use with the anti-theft feature of this invention, the power up-clear circuit 52 which initializes the address registers 36 and 37 of the ROM 30 must be separated from the keyboard clear circuit which is used to clear the calculator after one calculation sequence and prepare it for another sequence. The calculator chip shown in FIGS. 5, 6a and 6b includes a power up-clear circuit 52 and a clear calculator circuit 53. The function of the power up-clear 52 is to zero the registers of the calculator chip 14 and insert into the address registers 36 and 37 the first address of the instructions in the code check routine. Once the code check routine has been completed, if the proper code has been entered from the keyboard, the flag logic 28 will operate the clear calculator circuit 53. This circuit zeros the registers of the calculator chip in a manner similar to that used by the power up-clear circuit 52, but the clear calculator circuit 53 inserts the instruction address of the calculation routine into the address registers 36 and 37. Once the calculation routine has been entered, the calculator functions normally as an electronic calculator until it is switched off. The clear calculator circuit 53 is also connected to the keyboard 11 and is activated whenever the "clear key" 79 is depressed.

Figure 7A:
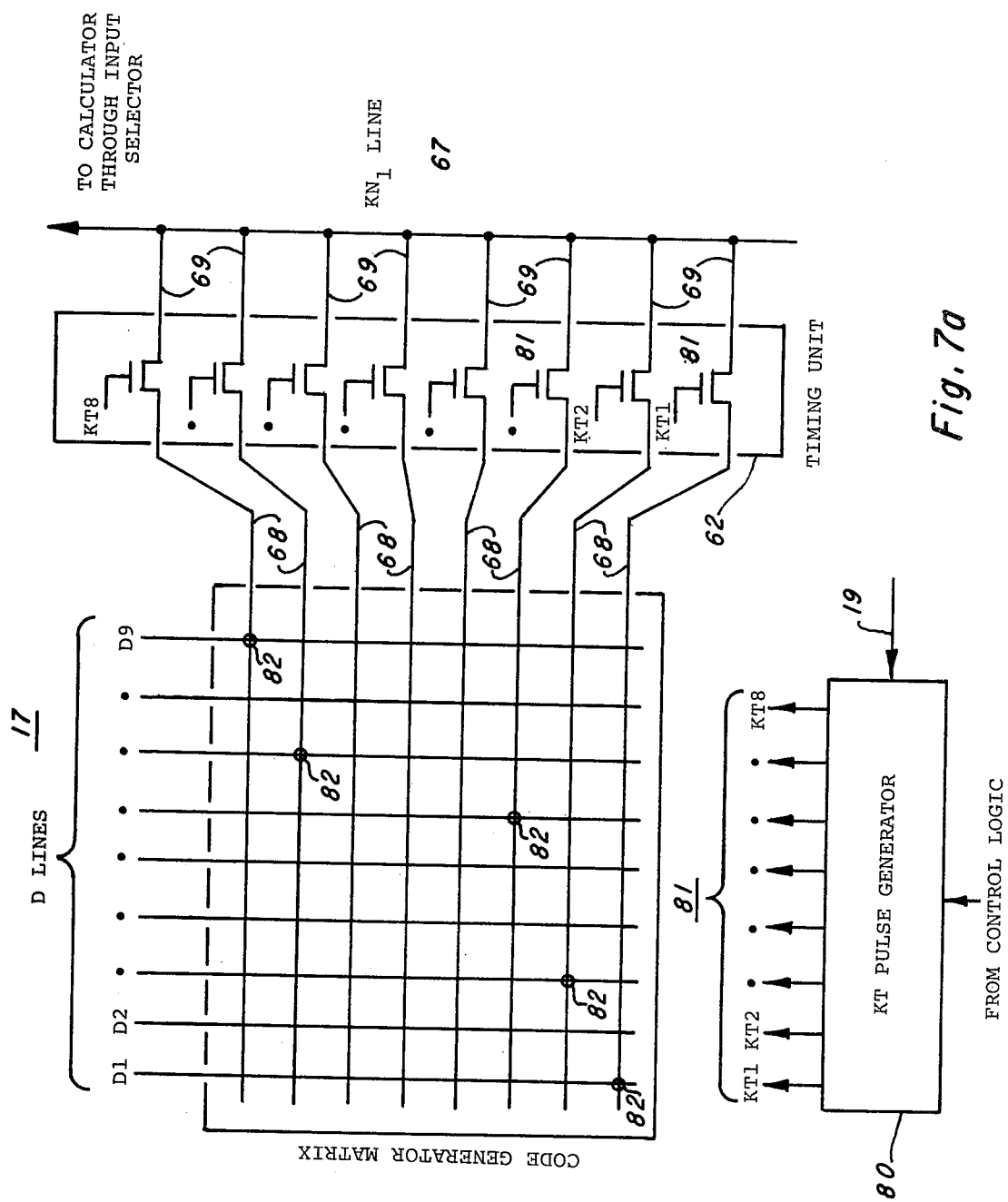
FIG. 7a is a schematic diagram of the portion of the code generator chip which actually produces the individual anti-theft code signals to the main calculator.

Referring now to FIG. 7a, there is shown a more detailed illustration of the code generator 61 and the timing unit 62 which are contained within a single LSI semiconductor chip. While the code generator may be a ROM, in the preferred embodiment, the D lines 17 may be continued as metallized strips in a grid formation crossing over horizontal "P" diffusions 68 with a layer of insulating material between the strips and the diffusions except at points where electrical connections are to be made between them. The electrical connections (or thinned oxide gates) 82 between the D lines 17 and the output lines 68 determine the eight digit code of the particular code generator chip 60. Note that the eight digit code of the particular embodiment shown in FIG. 7a is 13622179. For example, the bottom horizontal line in the code generator 61 corresponds to the first digit of the code. Depending on which D line 17 is connected to this bottom line 68, the first digit of the eight digit code may be one (D1) as is shown in FIG. 7a, it may be two (D2), or it may be any other digit through nine (D9). Only one connection may be made between the D lines 17 and any one horizontal output line 68, although there may be more than one connection between the output lines 68 and any one D line 17. Thus, digits may be repeated in the code. The output lines 68 ae gated through a timing unit 62 sequentially. The gating signals are produced by the KT pulse generator 80 on the KT lines 81, with one KT line 81 connected to each of the gate units in the timing unit 62. The outputs 69 of the timing unit 62 are tied in common to the KN1 line 70 which transmits the eight digit code to the calculator 14 through the input selector 71.

Referring once again to FIG. 3, it may be seen that there are ten D times for each one scan time. The D times occur sequentially through the scan time.

Figure 7B:
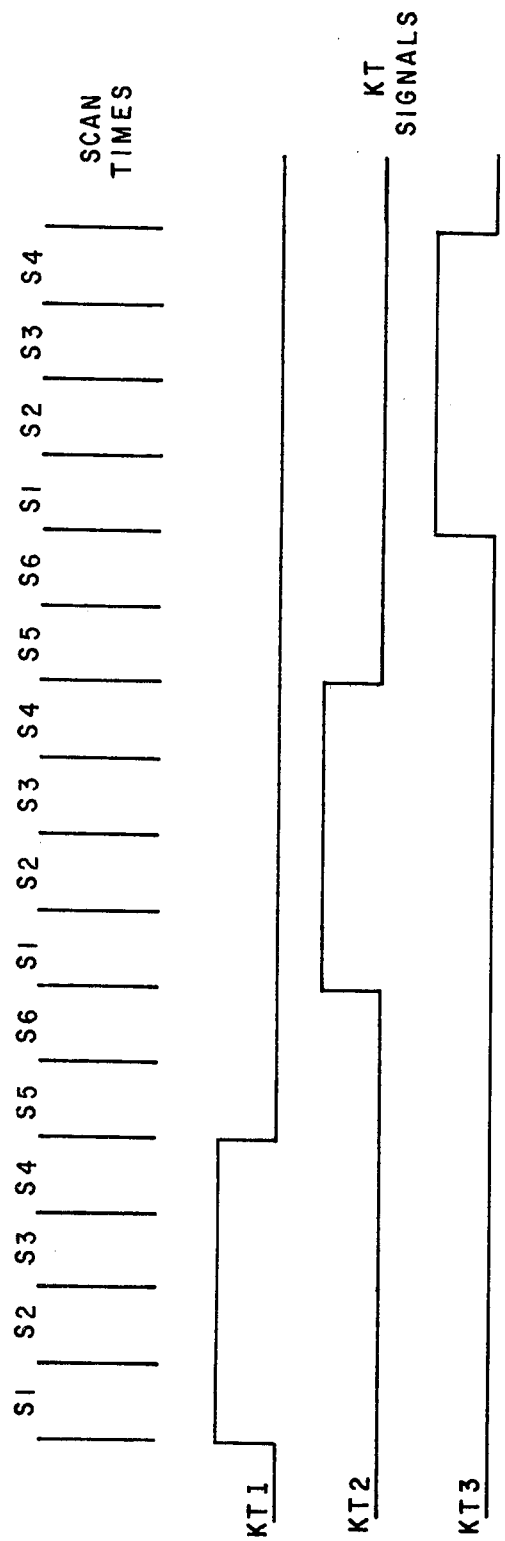
FIG. 7b is a timing diagram showing the relationship of the code timing signal to the scan times of the main calculator.

Now referring to FIG. 7b, it may be seen that in this embodiment the KT pulses have a duration of four scan times, and because there are ten D times per scan time, the KT pulses last for forty D times. Only eight KT pulses are generated by the KT pulse generator 80 before it is disabled by the control logic 72. This is done because the ROM 30 of the main calculator chip 14 is only programmed to accept eight digits of code from the code generator chip 60. Only three of the KT pulses are shown in FIG. 7b. The KT pulses must last for more than one scan time in order to simulate the keyboard input which the main calculator chip 14 is programmed to accept.

Figure 8A:
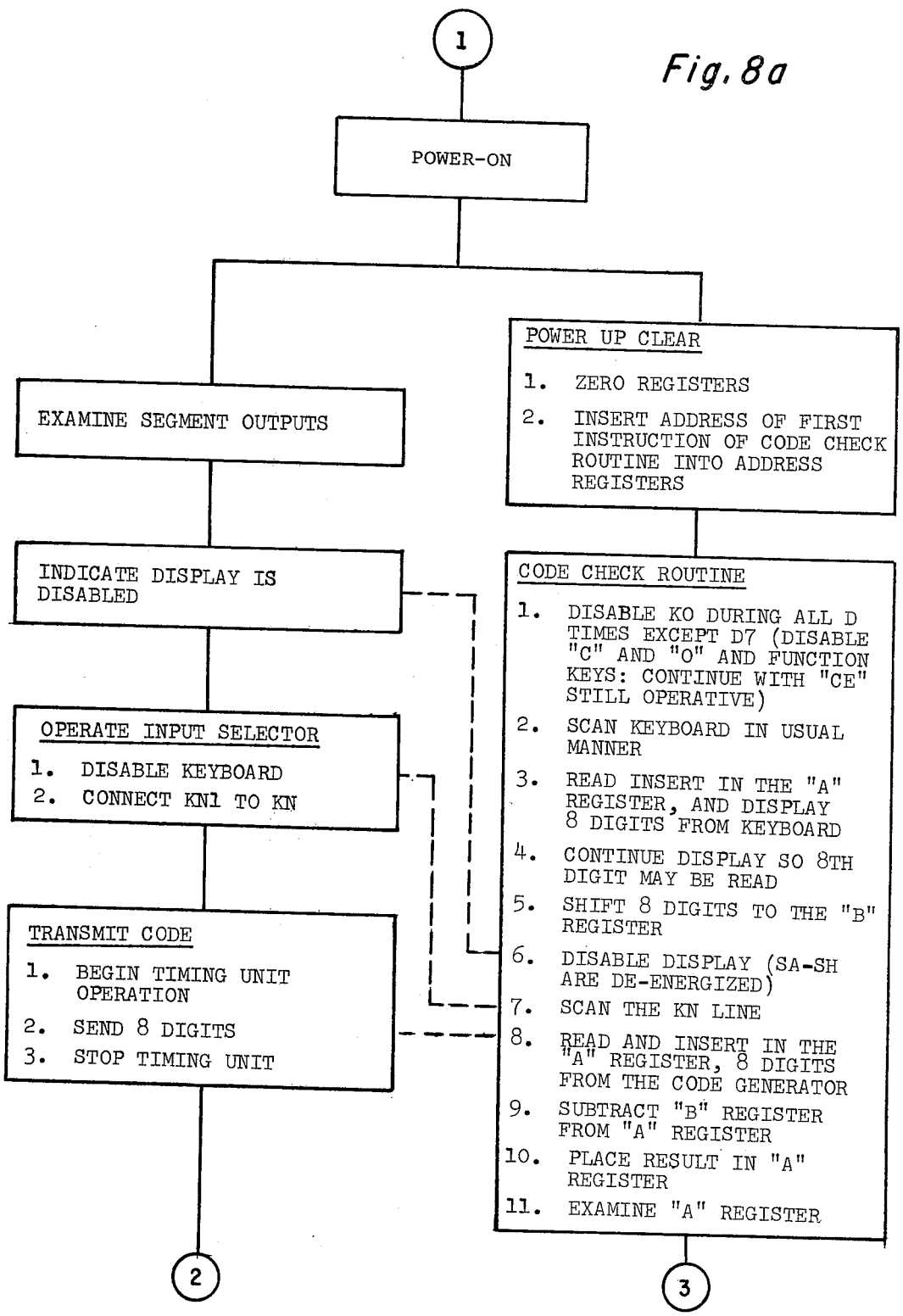
FIG. 8 is a combined flow chart which illustrates the code check routine of the main calculator program and the associated operations of the calculator chip and the code generator device.

FIG. 8 illustrates the code check routine and the associated operation of the main calculator chip 14 during the time from the initial operation of the power on switch 13 until the calculator is rendered ready for calculation or is disabled by an improper code input. The flow chart of FIG. 8 also shows the corresponding operation of the code generator 60. Operation begins when power is switched on. The power up-clear circuit 52 zeros the registers of the calculator chip 14 and initializes the address registers 36 and 37 of the ROM 30 to begin the code check routine is entered, instructions are produced which disable the KO line 18 during all D times except D7 which corresponds to the operation of the clear entry key 83. This is accomplished by means of the keyboard inhibit 50. Except for the disabled KO line 18, the keyboard is scanned in the usual manner, displaying any inputs which are detected. The ROM 30 is programmed to read only eight digits from the keyboard 11 and to insert those eight digits into the A register as usual.

During the period just described, the segment output test circuit 64 of the code generator chip 60 is examining the segment outputs 16 which are used to drive the display 12. The segment outputs 16 will be energized since the digits punched in are displayed as usual and, even if no digits are inserted, a zero is read on the display. The segment output test circuit 64 will detect the presence of these signals. The counter 63 insures that the segment outputs 16 are examined long enough to determine if they are truly off or are merely switching.

Returning now to the main chip 14 and its code check routine, after the eighth digit is read from the keyboard 11, the display 12 will continue for a period of time long enough so that the last digit inserted may be read by a user of the calculator. Once this reading period is over, the calculator chip 14 is programmed to shift the contents of the A register, which now holds the eight digits inserted from the keyboard 11, to the B register. The display 12 is then disabled by means of the display inhibit 49, and all the segment outputs 16, SA through SH, are de-energized. Once it is determined by the segment output test circuit 64 that the segment outputs 16 are de-energized, an indication of that fact is sent on line 73 to the control logic 72. This circuit operates the input selector 71 to disable the keyboard 11 and connect the KN1 line 70 to the KN line 67. The control logic 72 also begins the operation of the timing unit 62. When the timing unit 62 is enabled, the code generator 60 is ready to transmit an eight digit code to the main calculator chip 14 by means of the KN line 67. The display 12 is disabled during this period because it would otherwise display the proper code as it is applied as input to the main calculator chip 14. The proper code must be inaccessible to the display 12 in order to meet the goals of the invention.

Once again, the calculator is programmed to read eight digits, from the code generator 60 in this case, on the KN line 67. These digits are inserted as usual into the A register of the SAM 20. Once these eight digits have been read, the B register containing the eight digits received from the keyboard 11 is subtracted from the A register containing the eight digits from the code generator chip 60. The result of this subtraction is placed in the A register. The code check routine then produces instructions which cause the calculator to examine the A register contents. There are two possible situations which may occur at this time.

If the contents of the A register are not equal to zero, the code has not been properly entered from the keyboard 11. The calculator will then zero the A register and disable the KO, KN, and KP lines 18 inside the main chip 14, by operating the keyboard inhibit 50. At this point, the display will be enabled and, because the A register has been zeroed, the display will show a single zero in the rightmost column. No keys will function because the lines 18 have been disabled, and the zero will remain. The calculator may be switched off by the on/off switch 13, and the process of checking the anti-theft code may begin again. In this case, when the display is enabled and the zero in register A is displayed, segments A, B, C, D, E, F, and H will be energized to show a zero on the display. The segment output test circuit 64 which is continuing to examine the segment outputs will detect the presence of the segment output signals, and, through the control logic 72, the input selector 71 will be operated to return the keyboard input KNO line 65 to its connection with the KN line 67. Because, however, the keyboard inhibit 50 has been operated, the KP, KO, and KN lines will all be inhibited within the main chip 14. The control logic 72 will also operate the test inhibit 74 to prevent the further examination of the segment output lines 16, thus disabling the code generator 60 until the next time power is switched on.

In the alternative, if it is determined that the A register contents are equal to zero, the code has been properly entered. The clear calculator circuit 53 is operated to zero the registers and insert the beginning address of the calculation routine in the address registers 36 and 37. The display is then enabled and will show a zero because the contents of the A register are equal to zero. The keyboard inhibit 50 will be operated in order to enable the KO line 18 on all D times. The presence of the segment output signals on lines 16 will cause the control logic 72 of the code generator device 60 to reconnect the KNO line 65 to the KN line 67. The control logic 72 also disables the segment output test circuit 64. The code generator device 60 is now inactive. Since the keyboard inputs 18 are now operative, and the calculation routine has been entered, the calculator can begin normal keyboard scan; normal calculation is now possible.

Another embodiment of this invention would involve storing, in the ROM of each calculator chip, an individual code which could be compared to the first entries from the keyboard to determine if the proper code had been entered. The calculator would be programmed to accept the entered code, compare it to the correct code (stored in the ROM), and, unless they matched, disable the keyboard or display. Except upon the entry of a proper code, the calculator might also be programmed to enter some indefinite wait routine. This embodiment provides the manufacturing advantage of allowing the calculator system and the anti-theft device to be produced in a single LSI chip, but it does require that each chip or each batch of chips be masked somewhat differently so as to produce many calculators with different anti-theft codes. One other manufacturing benefit of such an implementation of the concept of this invention is that no additional output pins are required. Only those pins needed for the original calculator device are required for the calculator chip with anti-theft feature provided.

The concept of this invention may also be embodied by providing a ROM in the main calculator device which contains all the possible codes which might be entered from the keyboard. The particular code associated with each device may be selected by making various combinations of connections of the input/output pins of the calculator chip. This can be accomplished by permanently connecting the selected output pins to a supply voltage or ground. For example, by using ten pins for this purpose, any one of $2^{10}$ or 1024 different codes within the calculator may be specified as the proper anti-theft code for a particular calculator. The combination of pins to be grounded constitutes an address for an address decoder which selects a particular storage word in the ROM which is stored in that address. The stored word contains the individual anti-theft code of this calculator. Once selected in this manner from among the other stored codes, this code may be compared to an entry from the keyboard as in the previously described embodiments so as to provide anti-theft protection, if necessary, by disabling the calculator chip or its associated external devices.

This implementation of the concept of this invention allows the calaculator system with anti-theft device to be manufactured in one LSI chip by a single process. Thus, without changing the masks for each batch of chips, it is possible to produce calculators with different anti-theft codes. The determination of the particular code associated with any calculator is made upon assembly by the selection of some of the output pins to be connected to ground or a supply voltage.

In one other embodiment of this invention, a device, which is capable of scanning the keyboard for the input of an anti-theft code and placing that entry in a working register, is used to examine the first inputs to the calculator. If these inputs match the individual anti-theft code stored internally in its ROM, the device will enable the main calculator chip. If not, no power is supplied to the portion of the calculator which performs the normal calculation functions, or in the alternative, the keyboard or display may be disabled. This embodiment might well be one in which some of the outputs of the main calculator chip, such as keyboard scan signals, are used in the anti-theft device to provide synchronization and to eliminate duplication of circuitry in the two devices.

This embodiment allows the smaller, somewhat less complicated device to store the individual code of the calculator. This type of device should be less expensive to manufacture than the main calculator chip. It also should be less expensive to manufacture a large number of these devices, each one provided with a different anti-theft code stored internally. This is more desirable than storing a different code within each calculator device during the calculator chip manufacturing process. Also in this embodiment, the ROM storage of the calculator chip need not be increased, and no additional output pins for the chip are required. These features of this embodiment represent significant manufacturing advantages.

While this invention has been described with reference to particular embodiments, this description is not meant to be construed in a limiting sense. Various modifications of the illustrated embodiments, as well as other embodiments of the invention, will be apparent to persons skilled in the art upon reading this description. Accordingly, it is contemplated that the appended claims will be interpreted to cover any such modifications or embodiments as fall within the true scope of the invention.

What is claimed is:

1. A portable, hand-held, electronic calculator which includes:
   keyboard input means including a plurality of keys for entering data and functions into the calculator;
   output means for displaying numerical data which is entered in the calculator via the keys or produced as the result of calculation;
   manually operable switching means having on and off positions through which power is supplied to said electronic calculator;
   calculating circuit means operably coupled to the keyboard input means and the output means to perform the normal calculation functions of the calculator; the improvement comprising:
   code-responsive means coupled to the keyboard input means and to the calculating circuit means to render the calculator unable to perform normal calculation functions after the switching means is switched from off to on until an anti-theft code is properly entered to said code responsive means from said keyboard input means.

2. An electronic calculator as defined in claim 1 further including:
   means for scanning said keyboard input means, means for reading the keyboard input immediately following the switching means being switched from off to on, and means for storing those inputs in sequence until a selected sequence of keyboard inputs has occurred corresponding to said anti-theft code;
   means for comparing the stored keyboard inputs to an individual anti-theft code;
   means for disabling said calculator; and
   means for actuating said means for disabling if, following switching from off to on, a sequence of keys of said keyboard input means are depressed which do not match the particular invidual anti-theft code of the calculator.

3. An electronic calculator as defined in claim 2 further including:
means for storing the particular individual anti-theft code to be associated with the calculator within said calculating circuit means.

4. An electronic calculator as defined in claim 2 further including:
a storage device for storing the individual anti-theft code separate from said calculating circuit means;
means for connecting said storage device, containing the anti-theft code, to the calculating circuit means; and
means for reading the anti-theft code stored in the storage device, processing, and storing said code within the calculating circuit means.

5. An electronic calculator as defined in claim 2 further including:
means for storing a plurality of possible anti-theft codes within the calculating circuit means; and
means for defining by terminal connections to said calculating circuit means which of the possible anti-theft codes will be associated with the particular calculator.

6. An electronic calculator as defined in claim 1 further including:
means for scanning said keyboard input means, means for reading the keyboard inputs immediately following switching from off to on, and means for storing those inputs in sequence until a plurality of inputs have been received;
means for comparing said plurality of keyboard inputs to an individual anti-theft code;
means for producing a disabled mode in said calculator upon the occurrence of a disable signal; and
means for producing said disable signal if, following switching from off to on, a sequence of keys of said keyboard input means are depressed which do not match the particular individual anti-theft code of the calculator.

7. An electronic calculator as described in claim 6 further including:
means for storing the particular individual anti-theft code to be associated with the calculator within the calculating circuit means.

8. An electronic calculator as defined in claim 6 further including:
a storage device for storing the individual anti-theft code external to the calculating circuit means;
means for connecting said storage device, containing the anti-theft code, to the calculating circuit means; and
means for reading the anti-theft code stored in the storage device, processing, and storing said code within the calculating circuit means.

9. An electronic calculator as defined in claim 6 further including:
means for storing a plurality of possible anti-theft codes within the calculating circuit means; and
means for defining by terminal connections to said calculating circuit means, which of the possible anti-theft codes will be associated with the particular calculator.

10. An electronic calculator as defined in claim 1 further including a code check device separate from the calculating circuit means:
means for scanning said keyboard input means, for reading the keyboard inputs immediately following switching from off to on, and means for storing those inputs in sequence until a plurality of inputs have been received;
means for comparing said plurality of keyboard inputs to an individual anti-theft code;
means or disabling the keyboard input means or the output means of said calculator upon the occurrence of a disable signal;
means for producing said disable signal if, following switching from off to on, a sequence of keys are depressed which do not match the particular individual anti-theft code of the calculator system; and
means for enabling the calculating circuit means if the keyboard inputs immediately following switching from off to on match the individual anti-theft code.

11. An electronic calculator as described in claim 10 further including:
means, within the code check device, for storing the particular individual anti-theft code to be associated with the calculator.

12. An electronic calculator as defined in claim 10 further including:
means for storing a plurality of possible anti-theft codes within the code check device; and
means for determining by terminal connections to said code check device which of the possible anti-theft codes will be associated with the particular calculator.

13. An electronic calculator as defined in claim 1 further including a code check device separate from the calculating circuit means:
means for scanning said keyboard input means, for reading the keyboard inputs immediately following switching from off to on, and means for storing those inputs in sequence until a plurality of inputs have been received;
means for comparing said plurality of keyboard inputs to an individual anti-theft code;
means for disabling the calculating circuit means upon the occurrence of a disable signal;
means for producing said disable signal if, following switching from off to on, a number of keys are depressed which do not match the particular individual anti-theft code of the calculator; and
means for enabling the calculating circuit means if the keyboard inputs immediately following switching from off to on match the individual anti-theft code.

14. An electronic calculator as described in claim 13 further including:
means, within the code check device, for storing the particular individual anti-theft code to be associated with the calculator.

15. An electronic calculator as defined in claim 13 further including:
means for storing a plurality of possible anti-theft codes within said code check device; and
means for determining by terminal connections to said code check device which of the possible anti-theft codes will be associated with the particular calculator.

16. A portable, hand-held, electronic calculator which comprises:
keyboard input means including a plurality of keys for entering data and functions into the calculator;

output means for displaying numerical data which is entered in the calculator via the keys or produced as a result of calculation;

calculating circuit means, coupled to the keyboard input means and the output means, which performs the normal calculation functions of the electronic calculator;

switching means, having power off and power on conditions, through which power is supplied to the calculator;

means included in the calculating circuit means for scanning said keyboard input means immediately following the switching means being changed from power off to power on and for reading and storing signals from said keyboard input means;

means responsive to the stored signals for producing a disable signal if the first signals from said keyboard input means do not match an anti-theft code which is individual to the calculator, and means in the calculator responsive to said disable signal for rendering the calculator unable to perform usual calculating functions.

17. An electronic calculator as defined in claim 16 further comprising:

means for providing a control signal when a plurality of signals from the keyboard input means have been read and stored;

a code generator device for producing, upon the occurrence of said control signal, a timed code signal which corresponds to an individual anti-theft code;

means coupled to the output means for preventing the display of said generated code signal;

means for reading said generated code signal;

means for comparing said generated code signal to the stored signals from the keyboard input means;

means for producing said disable signal if the generated code signal does not match said signals from the keyboard input means; and means for rendering said keyboard input means, said calculating circuit means, and said output means capable of performing normal input, normal calculations, and normal output functions if said signals from the keyboard input means match said generated code signal.

18. An electronic calculator as defined in claim 17 further including:

means for storing an individual anti-theft code within the code generator device, said code to be the code associated with the particular calculator.

19. An electronic calculator as defined in claim 17 further including:

means for storing a plurality of possible anti-theft codes within a storage device; and means for determining, by terminal connections to said storage device, which of the possible anti-theft codes will be associated with the particular calculator.

20. A portable, hand-held, electronic calculator of the type having power off and power on conditions, which comprises:

(a) keyboard input means for entering data and functions into the calculator;

(b) an output means for displaying numerical data which is entered in the calculator or produced as a result of calculation;

(c) calculating circuit means which performs the normal calculation functions of the electronic calculator;

(d) means included in the calculating circuit means for scanning said keyboard input means immediately following power on condition;

(e) means for reading and storing said inputs from the keyboard input means;

(f) means included in the calculating circuit means for producing a disabled mode of operation upon the occurrence of a disable signal; and (g) means for producing said disable signal if the first entries from said keyboard input means do not match an anti-theft code which is individual to the calculator.

21. An unauthorized use prevention device for an electronic calculator of the type having a keyboard for entering data into the calculator and means for processing the entered data, comprising:

means responsive to a predetermined data sequence for providing an enabling signal;

means operatively coupled to said enabling signal providing means and to said keyboard for rendering said enabling signal providing means responsive to data entered by said keyboard; and means operatively coupling said enabling signal providing means to said calculator for rendering said calculator operative to process subsequent data entered by said keyboard upon receipt of said predetermined data sequences.

22. An unauthorized use prevention device as recited in claim 21 wherein said means for rendering said enabling signal providing means responsive to data includes means for storing signals representative of the data entered by said keyboard, and said enabling signal providing means is electrically coupled to said data representative signal storing means for monitoring the data representative signal stored therein.

23. An unauthorized use prevention device as recited in claim 22 wherein said calculator includes a visual data display device operatively coupled to said data representative signal storing means, said data display device being responsive to the data representative signals stored in said storing means for generating a visual display of the data stored therein.

24. An unauthorized use preventing arrangement for a calculator system of the type embodying a keyboard for entering data into the system and means for processing the data entered in the system, comprising means responsive to interruption of the system for rendering the system incapable of processing data entered from the keyboard subsequent to said interruption in operation of the system, and means responsive to preliminary operation of the keyboard in accordance with a predetermined data sequence for rendering said system capable of processing data thereafter entered in the system through further operation of the keyboard.

* * * * *